No. 807,791. PATENTED DEC. 19, 1905.
A. TCHERNIACK.
LOOM FOR WEAVING.
APPLICATION FILED NOV. 28, 1903.
8 SHEETS—SHEET 8.
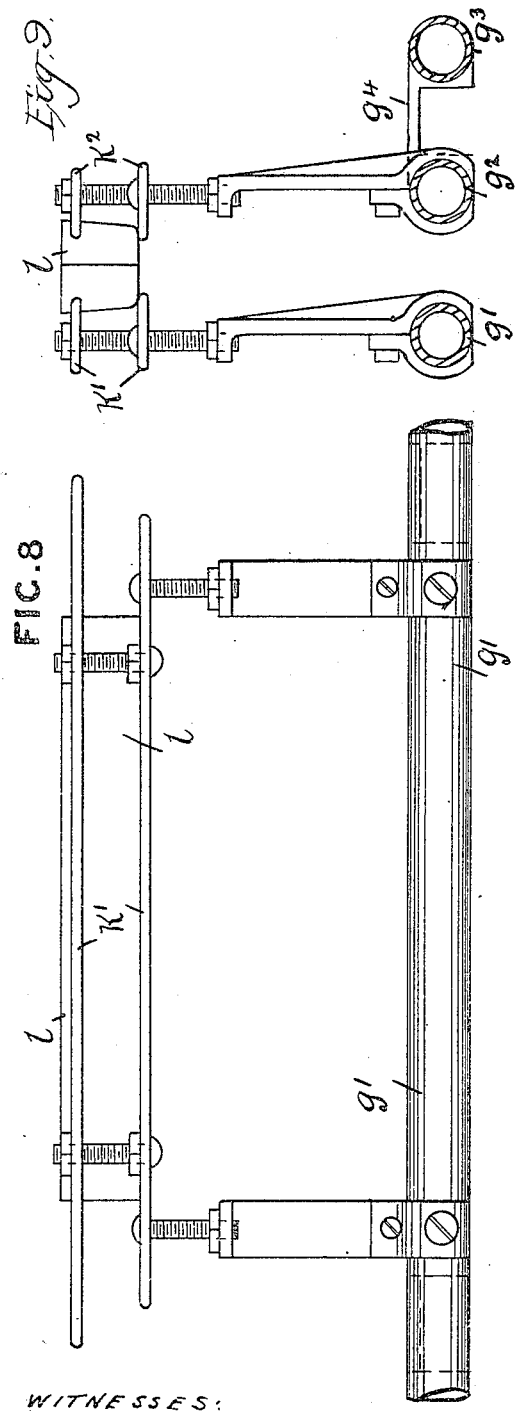
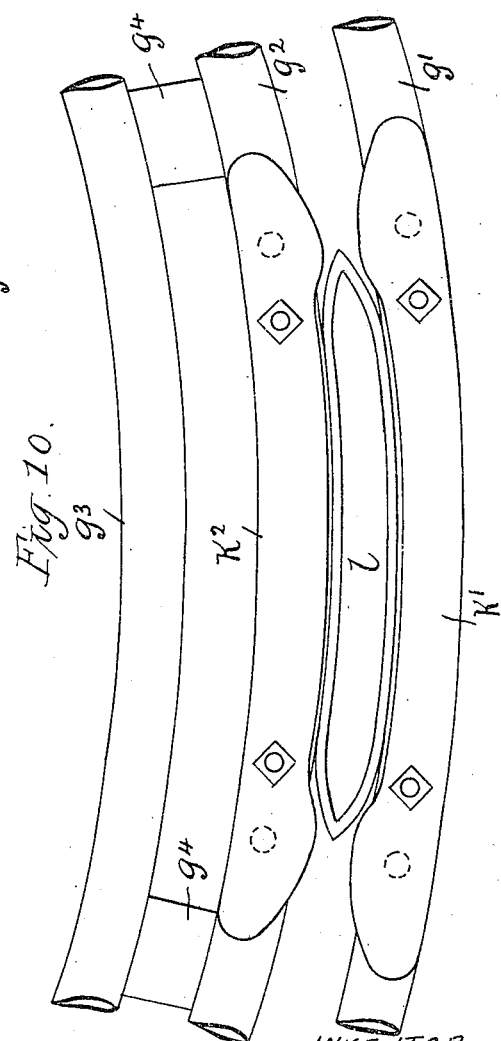
WITNESSES:
F. W. Wright.
E. W. Collins.
INVENTOR
Abraham Tcherniack
BY Howson and Howson
HIS ATTORNEYS.

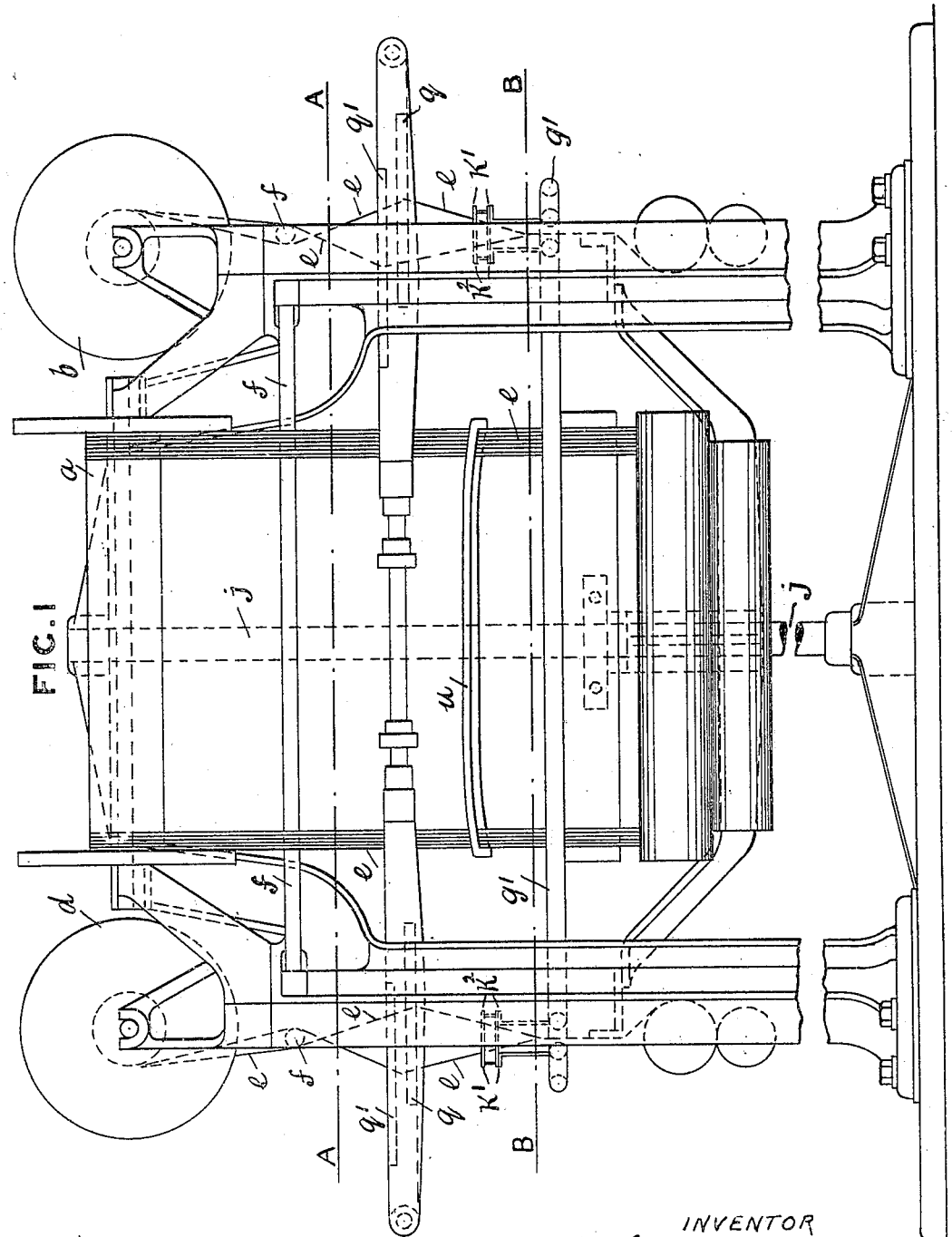

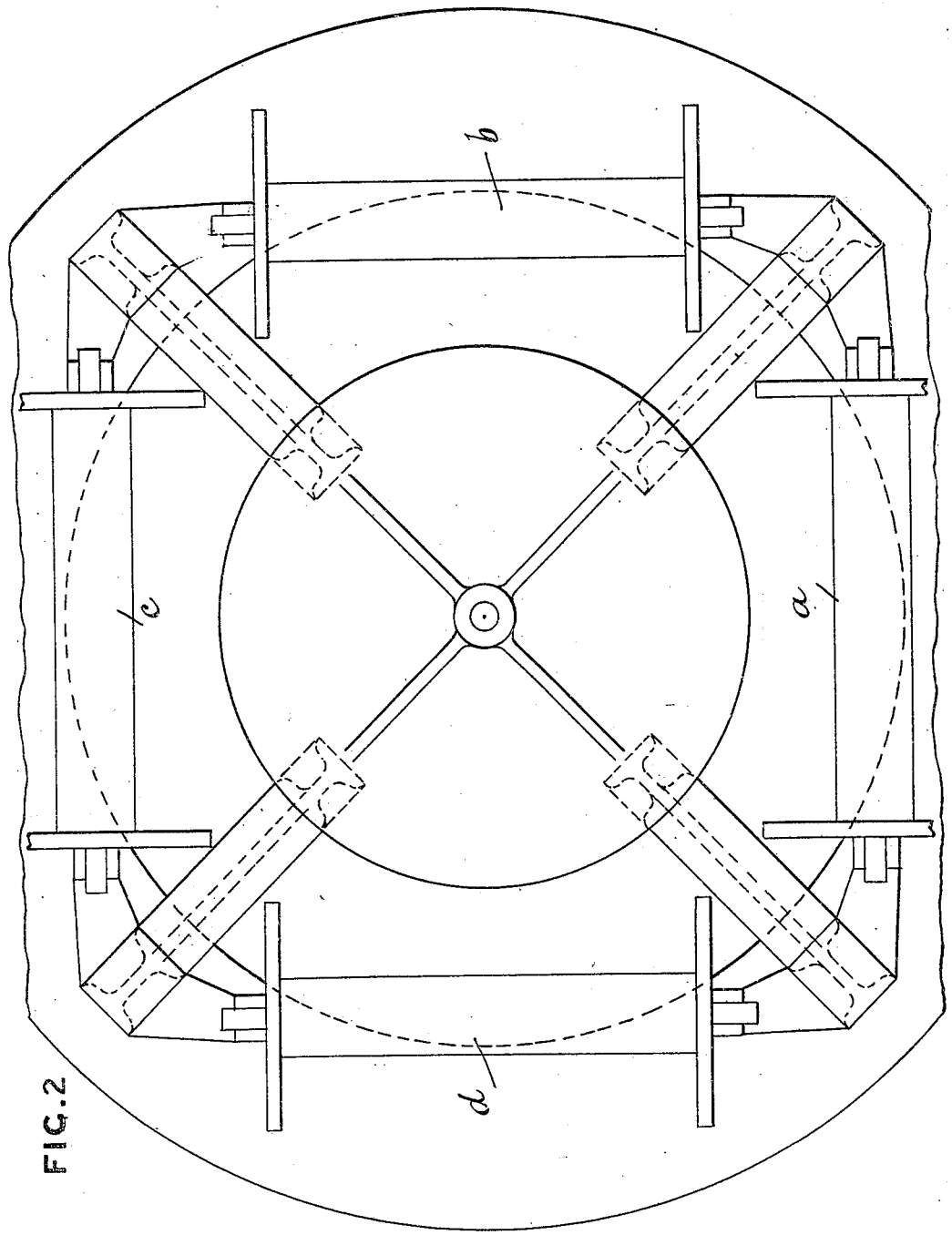

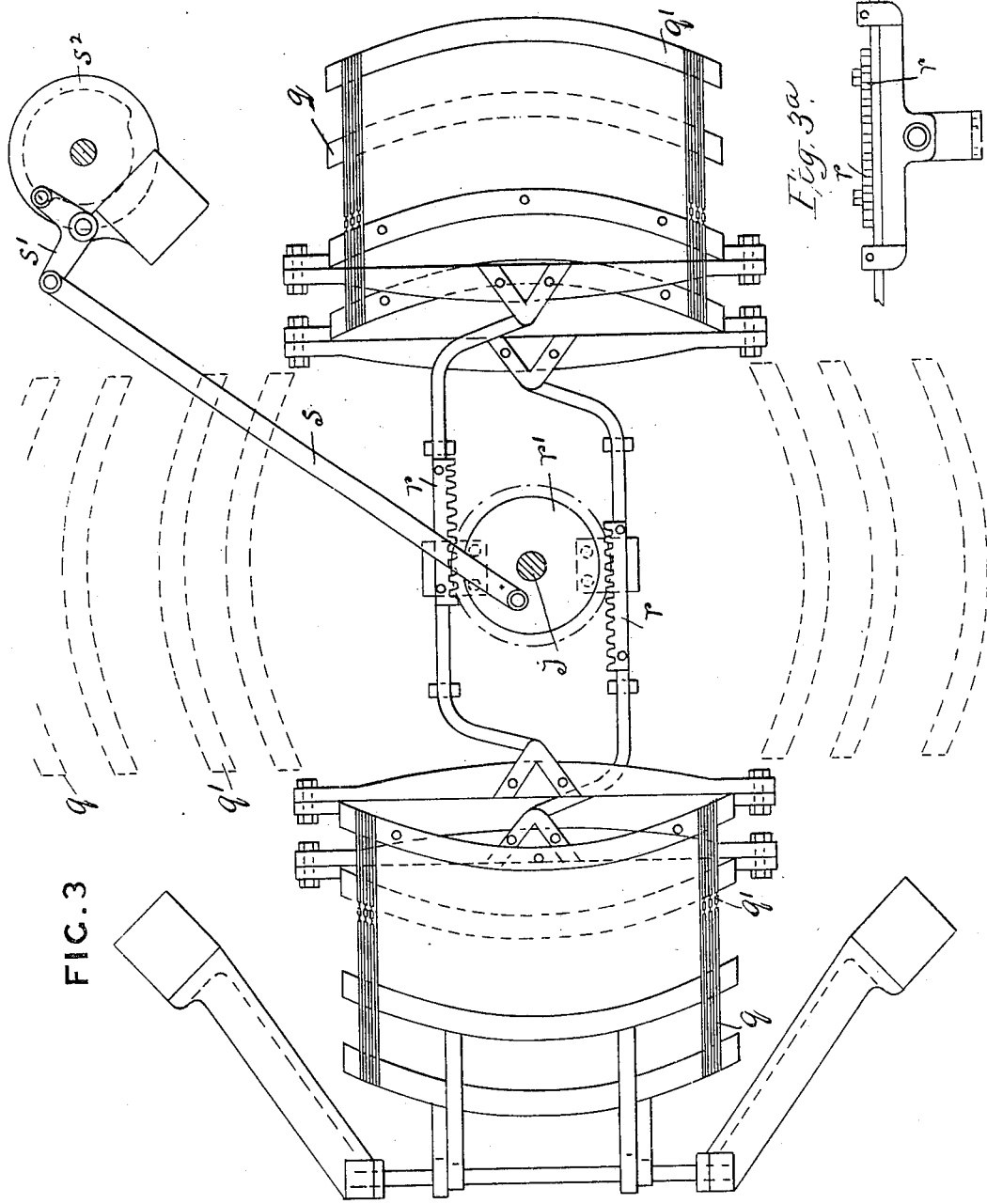

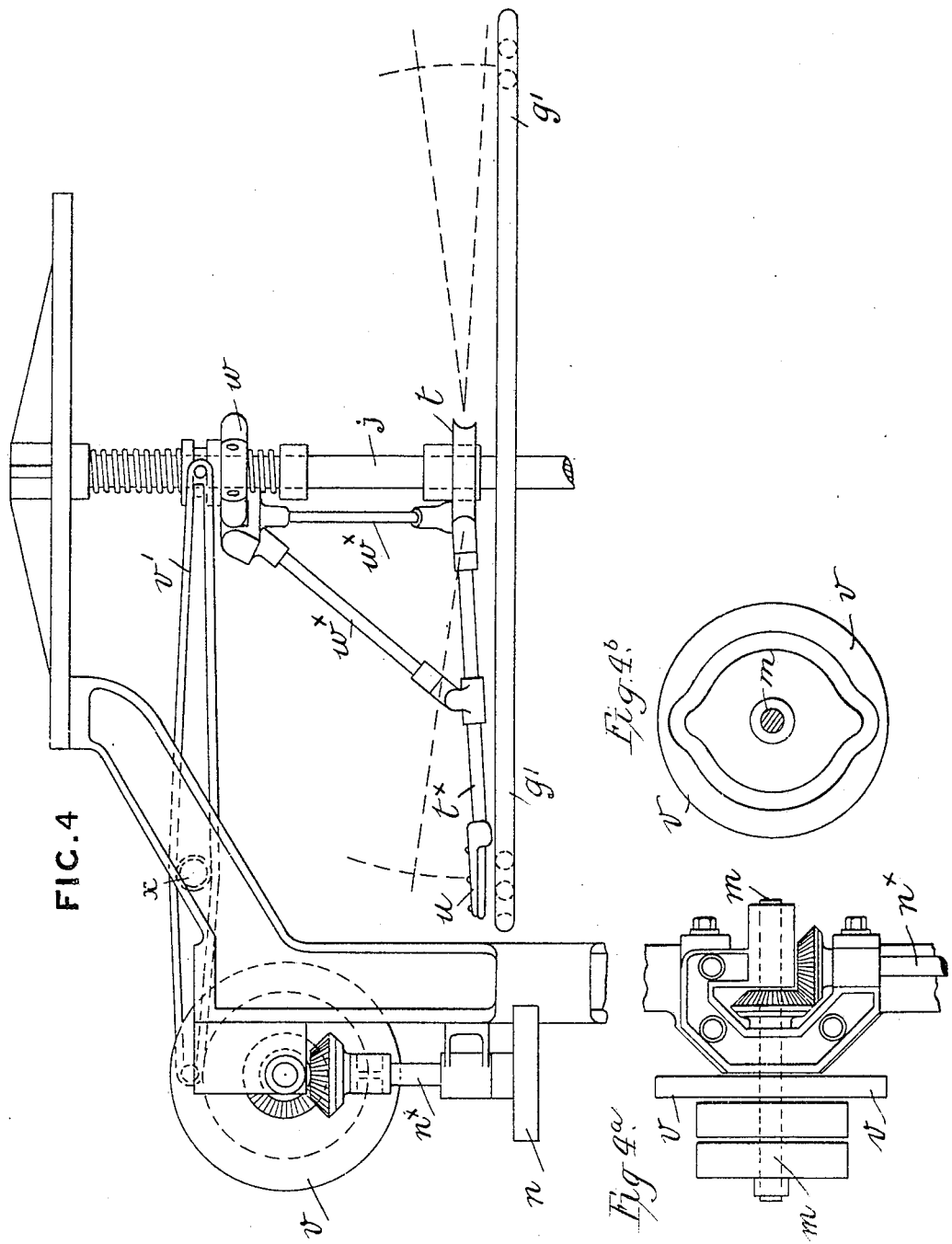

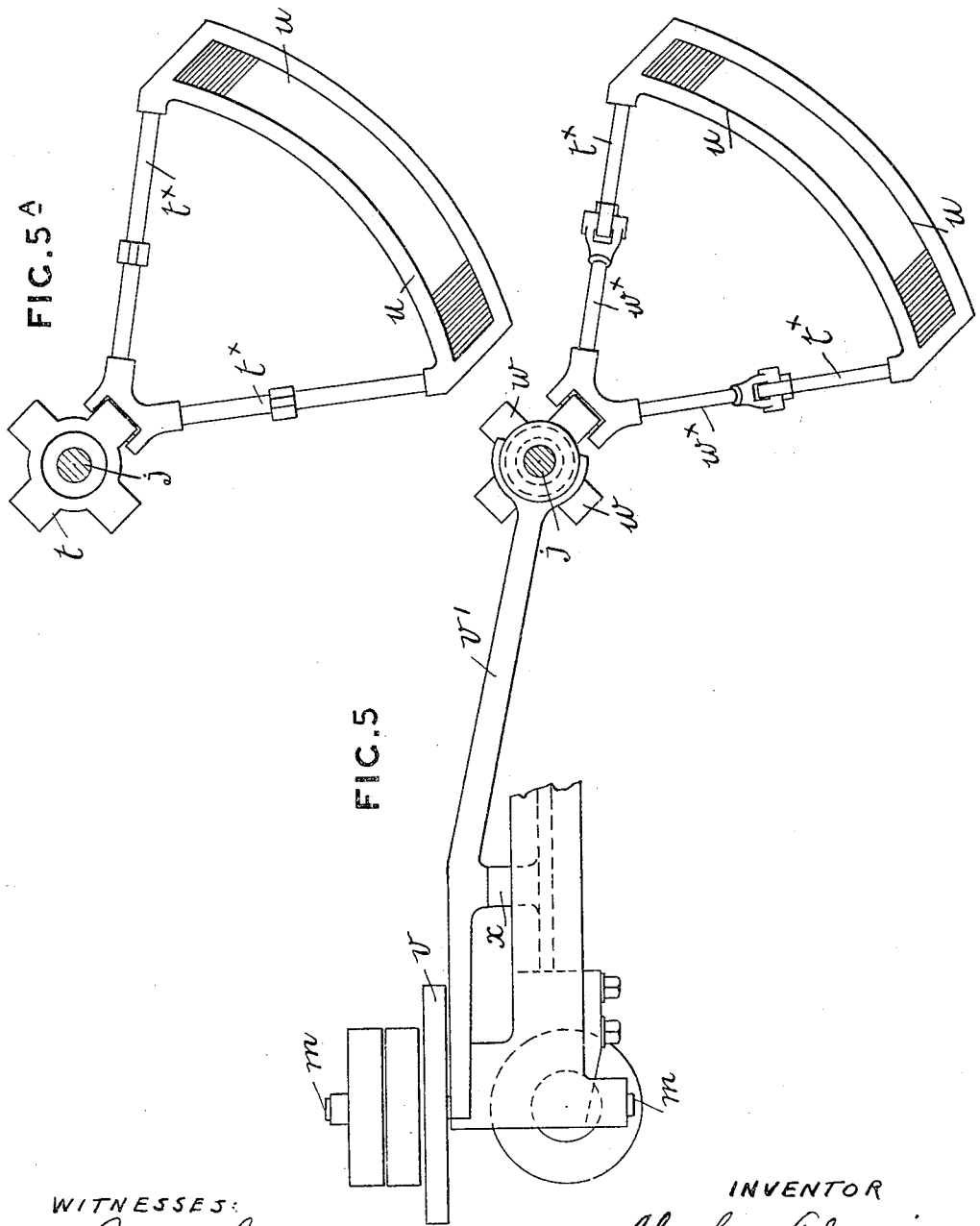

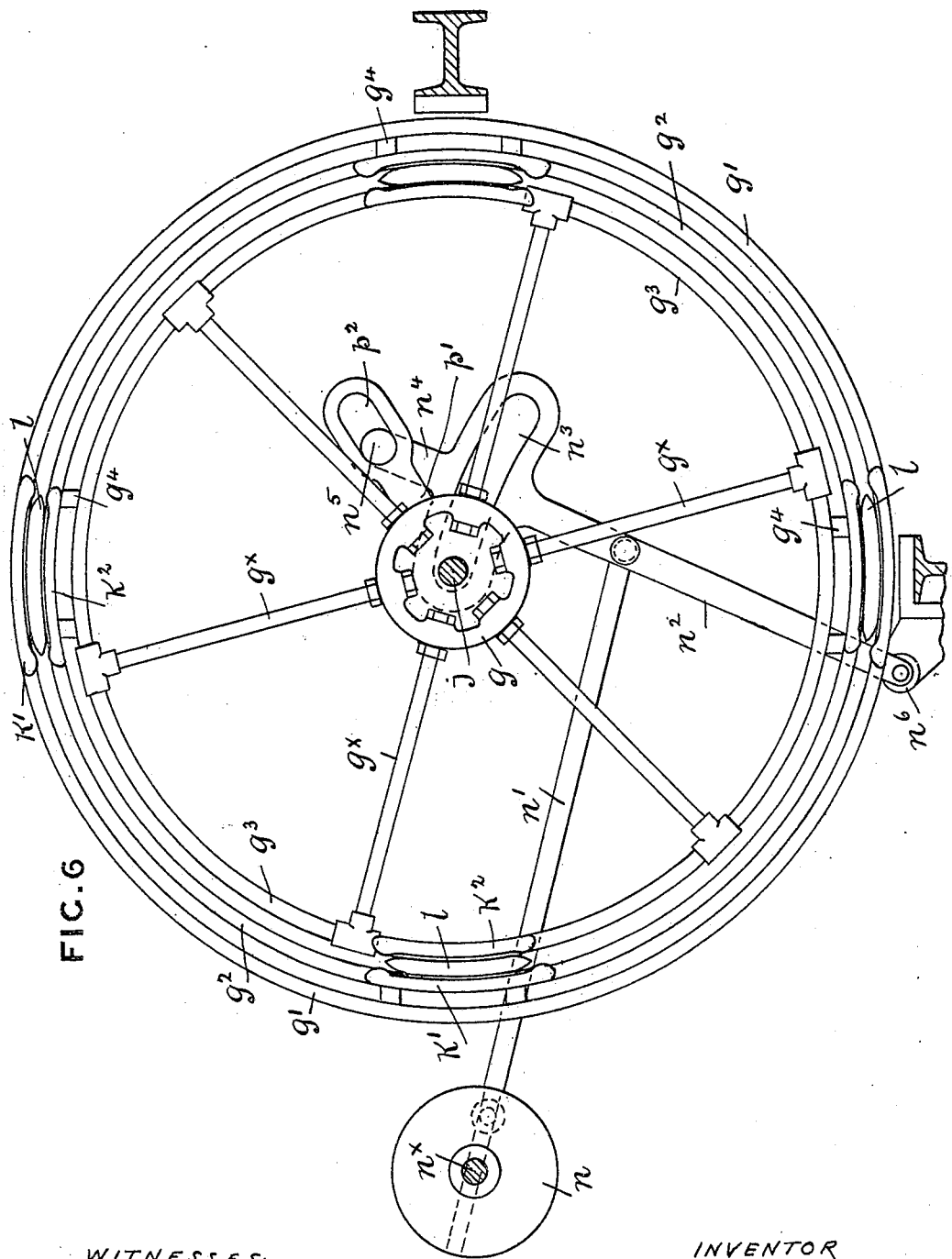

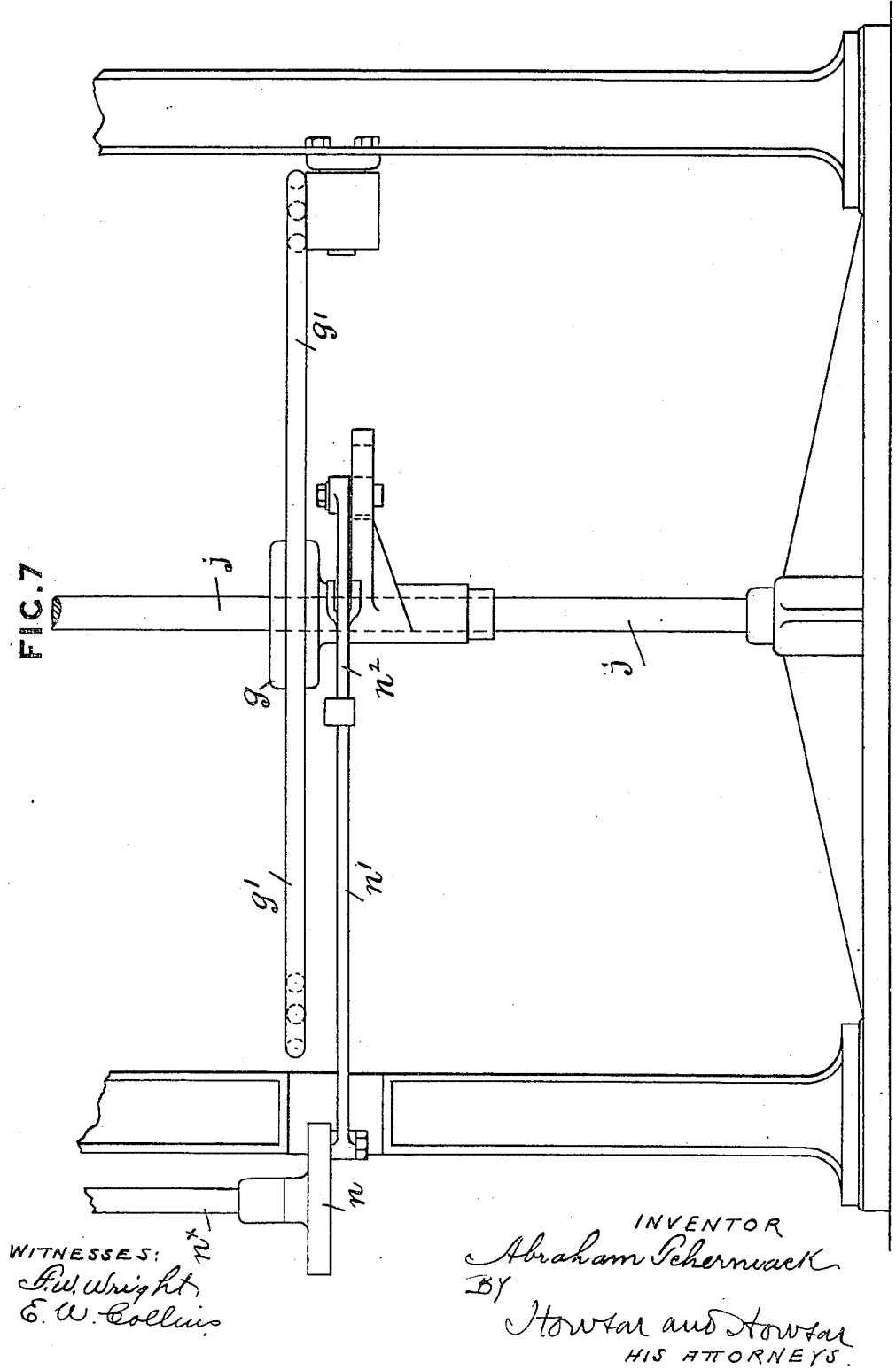

UNITED STATES PATENT OFFICE.

ABRAHAM TCHERNIACK, OF MOSCOW, RUSSIA.

LOOM FOR WEAVING. REISSUED

No. 807,791. Specification of Letters Patent. Patented Dec. 19, 1905.

Application filed November 28, 1903. Serial No. 183,012.

*To all whom it may concern:*

Be it known that I, ABRAHAM TCHERNIACK, a subject of the Czar of Russia, residing at The Imperial Technical High School, Moscow, Russia, have invented new and useful Improvements in Looms for Weaving, of which the following is a specification.

The improvements which form the subject of this invention relate to the construction of looms for weaving.

The objects of my said invention are (*a*) to enable two or more pieces of cloth of the same or different widths and texture to be woven simultaneously in one loom; (*b*) to permit the weft to be introduced into the cloth being woven positively without the shock and noise caused by the use of the fly-shuttle, as ordinarily employed, and (*c*) to economize power and also space by occupying less room relatively to the work produced than looms as ordinarily employed.

In the accompanying drawings, Figure 1 is a side elevation of a circular multifabric loom of this invention. Fig. 2 is a plan view of the frame and beams. Fig. 3 is a section on line A A, Fig. 1, with portions omitted for clearness; and Fig. $3^a$ is a detail of the rack and gear of Fig. 3. Fig. 4 is a side elevation of a portion of the loom, showing driving-shaft and weft-beating mechanism. Fig. $4^a$ is a side elevation at right angles to Fig. 4 of a detail of the main driving-shaft. Fig. $4^b$ is a face view of the cam $v$. Figs. 5 and $5^a$ are detail plan views of the weft-beating mechanism. Fig. 6 is a plan of the circular trackway on line B B, Fig. 1. Fig. 7 is an elevation of a detail of the reciprocating mechanism for the trackway. Fig. 8 is a detail of the holder for the shuttle in side elevation. Fig. 9 is an end view, and Fig. 10 a plan view of Fig. 8.

In the views the same letters refer to like parts.

According to my invention I construct a loom which may be arranged either, as shown in the drawings, so as to be equal in the means of production to four ordinary looms of the same or different widths, or said loom may be arranged so as to be equal in the means of production to a lesser or a larger number of said ordinary looms by decreasing or increasing the number of beams $a\ b\ c\ d$ (shown in Fig. 2) and the complete sectional portion,(shown in Fig. 1,) which in combination with the beam $a$ forms an independent loom. The description of this portion will apply to the other sectional portions that are respectively in combination with the beams $b$, $c$, and $d$. The warp-threads $e$ are arranged vertically and are drawn from the beam $a$ over the rounded edge of the bar $f$. A shuttle-carrier consisting of a central boss $g$, Fig. 6, and rings, as $g'\ g^2\ g^3$, separated from each other by distance-pieces $g^4$, secured to said boss by arms, as $g^\times$, is fitted loosely on a vertical shaft $j$, placed centrally in the loom. The space in a circular direction between the aforesaid distance-pieces is equal to twice the width of the cloth to be woven plus the length of the shuttle-box and weft-fork with the necessary space for clearance. The shuttle-boxes are formed of plates, as $k'$ and $k^2$, which are fixed alternately to the center and outer rings $g^2$ and $g'$ and to the center and inner rings $g^2$ and $g^3$ in such a manner that the center of the space between the inner edges of said plates is the same as the center of the space between the two rings to which they are fixed, as shown in Fig. 6.

The inner ends of the aforesaid plates are curved inward toward each other, forming boat-shaped recesses, in which correspondingly-formed shuttles $l$ are placed. Said shuttles have a tongue therein on which to place the cop in the ordinary manner. Between the inner surface of the shuttle-box and the outer surface of the shuttle therein is a free space or opening for the passage of the warp-threads, between which the shuttle is caused to traverse for the purpose of introducing the weft. On the opening of a shed in the warp-threads which pass through the space between the rings of the shuttle-carrier opposite their corresponding shuttle-boxes and by revolving said shuttle-carrier with the shuttle-boxes affixed thereto, (the number of which corresponds with the number of pieces to be woven simultaneously,) the shuttles are passed through the sheds, the warp-threads passing between the inner surfaces of the shuttle-boxes and the outer surfaces of the shuttle, the weft being by these means threaded in. In order to cause the shuttle-carrier to have a reversible semirotary movement, I fit on the shaft $n^\times$ of the loom either a crank or a disk $n$, as shown in Figs. 4, 6, and 7, which by means of a connecting-rod $n'$ communicates motion radially to a lever $n^2$, pivoted to the frame at $n^6$, Fig. 6. Said lever is either cranked or formed with a slot, as $n^3$, so as to pass beyond the central pillar or shaft $j$. The inner end $n^4$ of the lever $n^2$ carries a bowl $n^5$, which slides in a slot $p^2$ in the free end of a lever $p'$, formed on or attached to the boss $g$ on the vertical shaft $j$.

The motion of the healds $q$ and $q'$, which are placed horizontally, is effected by means of a series of racks $r$, the number of which corresponds to the number of shuttles employed. Said racks gear into a pinion or pinions $r'$, revolving loosely on either the boss $g$ of the shuttle-carrier or on the shaft $j$, as shown in Fig. 3, and by means of the link $s$, the bell-crank lever $s'$, and a cam $s^2$ a partially-revolving motion is periodically communicated to the pinion or pinions $r'$, causing the racks $r$ to have a reciprocating motion, thereby moving the healds which are attached to the racks and forming the necessary shed for the shuttle to pass through. The eyes of the healds are arranged concentrically with the shuttle-carrier. The slay consists of a disk $t$, having arms $t^\times$ radiating therefrom, to which the reeds $u$ are attached, Figs. 5 and $5^a$, each reed forming the segment of a circle. The number of reeds corresponds to the number of shuttles and of pieces of cloth to be woven. The slay has a vertical reciprocating motion derived from a cam $v$ on the main shaft $m$. A lever $v'$, pivoted to the frame at $x$, is connected at one end to the cam $v$ and its opposite end to a boss $w$, sliding on the vertical shaft $j$. Said boss is connected by hinged levers $w^\times$, Fig. 4, to the arms $t^\times$, thereby effecting the beating up by raising the reeds $u$ each time the shuttle has passed the shed.

The taking-up motion consists of a suitable train of wheels worked by a pawl and acting on a surface roller, as in an ordinary plain loom.

In operation motion is imparted to the shaft $m$, which carries the cam $v$, so shaped as to actuate the lever $v'$ twice at each revolution. The shaft $m$ through bevel-gears operates shaft $n^\times$, which carries the disk $n$, operating the connecting-rod $n'$, slotted lever $n^2$, and crank-arm $p'$, so as to reciprocate the trackway once at each revolution of the shaft $m$. The cam $s^2$, Fig. 3, may be connected in any suitable manner with said shaft $m$. I have not illustrated such means in my drawings, as a manner of so doing will be obvious to one skilled in the art. This cam $s^2$ through the link $s$, gear $r'$, and racks may change the shed after each reciprocation in one direction of the trackway of rings. As the trackway moves contra-clockwise from the position of Fig. 6, each shuttle will be carried at a substantially constant speed (not thrown across, as usual) through the shed previously formed by the frames $q\ q'$, which have been previously reciprocated. The open-mouthed ends of the plates $k'\ k^2$, forming the shuttle-holder, guide the shed-threads into the space between the plates, which threads spring out when they have passed the contracted opening of the holder, and one side of the shed passes to one side of the shuttle, while the other side of the shed passes to the other side of the shuttle. The boat-shaped shuttle makes this passage simple, and the shuttle is practically floated upon the warps of the shed while it passes therethrough. Its shape prevents its vertical displacement from becoming so great as to cause it to leave its holder and prevents it from moving out of place horizontally to the trackway. When each shuttle has passed through that shed in which it is to operate, the slays are moved upon their hinged inner ends, as illustrated in dotted lines in Fig. 4, to beat up the weft-thread just inserted by the shuttles, and the frames for the healds are also reciprocated to produce a different arrangement of warp-threads. These two functions should of course be performed before the return of the shuttles and trackway in their clockwise direction of motion, which return may now take place and the operation just described be repeated.

I claim as my invention—

1. A loom for weaving having means for forming a number of separate vertical sheds, each on the arc of a circle, and grouped around a common vertical center, and a reciprocating operating mechanism for inserting separate weft-threads in the separate sheds.

2. A loom for weaving, having means for forming a number of separate sheds about a common center, separate shuttle for each shed, and means for reciprocating each shuttle backward and forward through its shed.

3. A loom for weaving, having means for forming a number of separate sheds, each on the arc of a circle, and grouped around a common center, a separate shuttle for each shed, and means for reciprocating each shuttle backward and forward through each shed.

4. A loom for weaving, having means for forming a number of separate sheds each on the arc of a circle and grouped around a common center, and a separate shuttle for each shed, and means for carrying each shuttle through its shed at a substantially constant speed and then reversing the direction of its carriages.

5. A loom for weaving a number of fabrics, comprising a circular trackway, and means for forming sheds perpendicular thereto, shuttles resting on said trackway, and means for passing said shuttles through the sheds by the movement of the trackway without displacing the shuttles horizontally upon the trackway.

6. A loom, comprising a trackway formed of concentric rings, between which warp-threads pass, means to form a shed, a shuttle held against horizontal motion upon said trackway, and means to operate said trackway, whereby, upon such operation the shuttle will be carried through the shed, one side of which will pass between one side of the shuttle and one ring and the other side of which shed will pass between the other side of the shuttle and another ring.

7. A loom, comprising a trackway composed of a number of circular rings, means thereon for holding a shuttle against horizontal motion in the trackway, means for producing a shed passing between two of such rings, a shaft and arms therefrom carrying said rings and means for operating said rings to move them through the shed.

8. A loom, comprising a trackway composed of a number of circular rings, means for holding a shuttle against horizontal motion in the trackway, means for producing a shed passing between two of such rings, a shaft and arms therefrom carrying said rings and means for reciprocating said trackway through the shed.

9. A loom, having a trackway composed of a number of rings, a holder for a shuttle-carrier mounted on adjacent rings, said holder being so formed as to prevent horizontal displacement of the carrier and having its inner edges adapted to permit the carrier and holder to be traversed with the shed between them.

10. A loom for weaving, comprising a trackway composed of a number of rings, a holder for a shuttle in two vertical parts, attached to adjacent rings, the two parts forming a contracted opening at each end of said holder, and a shuttle held by gravity therein.

11. In combination with a circular trackway for looms, a shuttle-holder composed of plates, with a free passage between them, each plate having enlarged ends and a boat-shaped shuttle resting in the mid-portion of said holder.

12. A loom, having a plurality of separate sheds and a slay for each shed, said slays being hinged to a common center at one end and operating-arms adapted to move them on their hinges to beat up the weft-threads.

13. A loom for weaving a number of pieces of fabric at once, comprising a common central axis, a trackway composed of a number of rings and means to reciprocate said trackway on said common axis, gravity-held shuttles carried by said trackway, means to prevent their horizontal motion on said trackway, frames carrying the healds arranged about said common center and means for operating them to form the shed, and slays for beating up the weft, likewise arranged about said common center and hinged thereto on their inner ends, and means for moving said slays on their hinged ends.

In testimony whereof I have signed my name to this specification in the presence of two subscribing witnesses.

ABRAHAM TCHERNIACK.

Witnesses:
G. HARTNER, Jr.,
S. WISSOTZKY.